UNITED STATES PATENT OFFICE.

IDA HILL PECO, OF LOS ANGELES, CALIFORNIA.

COMPOSITION OF MATTER FOR POLISHING AND DRESSING FLOORS.

No. 910,569.   Specification of Letters Patent.   Patented Jan. 26, 1909.

Application filed June 1, 1908. Serial No. 436,041.

*To all whom it may concern:*

Be it known that I, IDA HILL PECO, a citizen of the United States, residing in the city and county of Los Angeles and State of California, have discovered and invented a new and useful Composition of Matter for Polishing and Dressing Floors, of which the following is a specification.

My composition consists of the following ingredients, viz: paraffin, spermaceti, white wax, beeswax, and corn meal, compounded in three different grades, combined in the manner and proportions, (in weight) stated, viz:

*Grade No. 1.*

| | |
|---|---|
| Paraffin | 25 % |
| White wax | $8\frac{1}{3}$% |
| Spermaceti | $8\frac{1}{3}$% |
| Beeswax | $8\frac{1}{3}$% |
| Corn meal | 50 % |

*Grade No. 2.*

| | |
|---|---|
| Paraffin | 22 % |
| Beeswax | 11 % |
| Corn meal | 67 % |

*Grade No. 3.*

| | |
|---|---|
| Spermaceti | 22 % |
| White wax | 22 % |
| Beeswax | 22 % |
| Corn meal | 34 % |

*Treatment.*—1st, melt all ingredients except the corn meal, 2nd, mingle them thoroughly by agitation, 3rd, cool the mixture, 4th, shave to fine shreds, 5th, add the corn meal and thoroughly mix, 6th, pulverize the whole to a fine powder.

In using the above named composition the floor should be first freed from sandy substances by sweeping. The composition should be applied by means of a sifter, in order that the powder may be evenly distributed. The powder may be rubbed into the surface by the use of a cloth-covered device or by the passage of the feet in dancing.

By the use of the above named composition a smooth, glossy and durable polish may be obtained, and the ingredients are so assembled as to prevent the floor from becoming viscous, either at first application or after long use.

I am aware that paraffin has been used for this purpose, and that patents have been granted upon the composition of it with other substances for the same use, but I am not aware that all of the ingredients of my composition, either in Grade 1, Grade 2, or Grade 3, have been used together.

What I claim, and desire to secure by Letters Patent of the United States, is—

1. The herein described composition of matter for the purpose of polishing and dressing the surface of dancing floors, containing paraffin, white wax, spermaceti, bees wax and corn meal.

2. The herein described composition of matter for dressing and polishing floors made of pine or other soft-grained wood, containing paraffin, bees wax and corn meal.

3. The herein described composition of matter for dressing, polishing and renovation hard-wood floors, containing spermaceti, white wax, bees wax and corn meal.

IDA HILL PECO.

Witnesses:
F. JORDAN,
FRANK E. DUNLAP.